Jan. 30, 1934.  F. W. CUTLER  1,944,876
WASHER
Filed Sept. 3, 1929
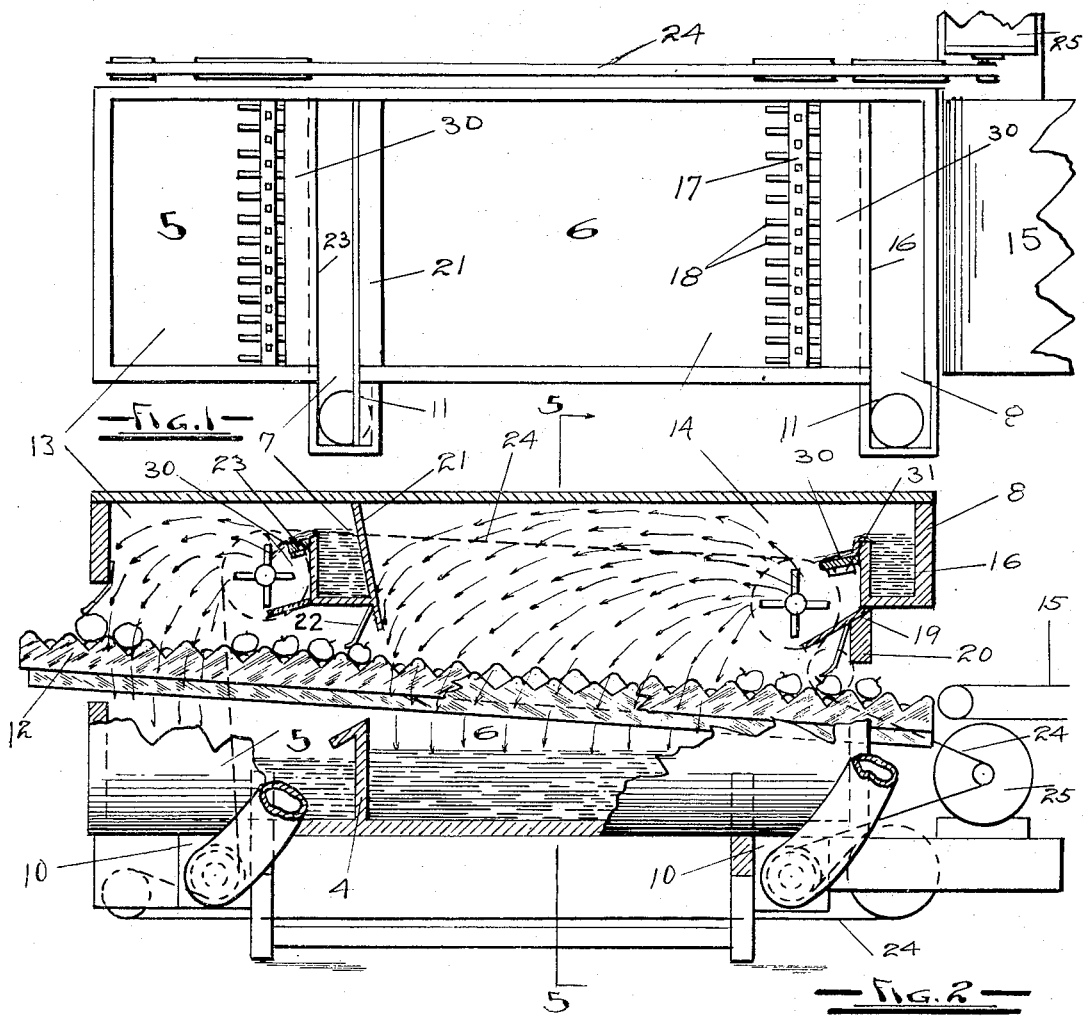
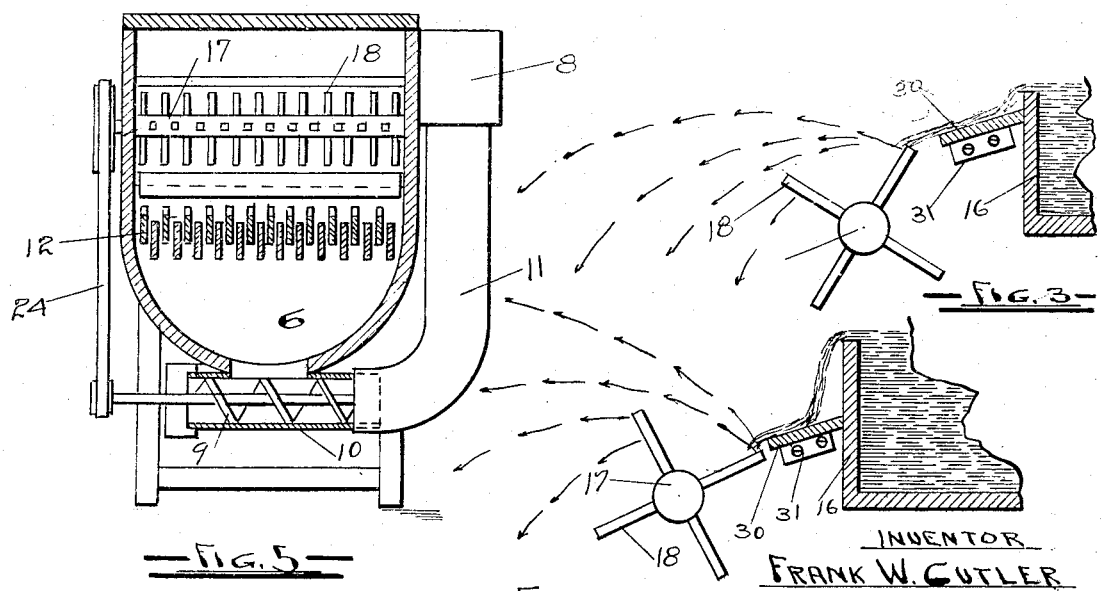
INVENTOR
FRANK W. CUTLER
BY C. F. Blake
ATT

UNITED STATES PATENT OFFICE 1,944,876

WASHER

Frank W. Cutler, Portland, Oreg., assignor to Food Machinery Corporation, San Jose, Calif., a corporation of Delaware Application September 3, 1929
Serial No. 390,053

8 Claims. (Cl. 146—194)

My invention relates to washers in general, and particularly to washers for fruit, the object being to provide a cheap and satisfactory device for removing the spray residue and other foreign matter from the fruit.

Heretofore there have been two forms of washers in general use for that purpose, one in which the fruit is submerged in a treating liquid, and one in which it is presented to an overhead spray. In the former there has not been sufficient agitation of the fruit in the liquid to accomplish thorough washing, and in the latter the fruit has not been continually subject to the washing liquid which has been directed upon the fruit in separated streams or jets. In the spraying devices this separation of the jets has resulted in a very large machine.

In the present device I subject the fruit to a treating liquid directed thereon from above, like the usual spray machine, but differentiated therefrom by the fact that in my device the liquid is not directed upon the fruit in separated streams or jets, but continually as the fruit passes through the device. Thus my device combines the continuous action found in the previous immersion devices with the desirable impact of the liquid upon the fruit found in the previous spray devices.

I accomplish the above object by means of the construction illustrated in the accompanying drawing, which is a part of this application for Letters Patent, like characters of reference indicating like parts throughout the several views thereof, and in which:

Fig. 1 is a plan view of my device with the cover removed therefrom, and not showing the conveyor therein.

Fig. 2 is a sectional longitudinal elevation thereof.

Figs. 3 and 4 are diagrammatic views of the weir.

Fig. 5 is a section upon line 5—5 of Fig. 2.

In general my device consists of a tank, divided if desired into a plurality of compartments for different treating liquids where such are desirable, and also divided by a suitable conveyor into washing chambers and sumps; means to circulate the liquids used through said washing chambers and their respective sumps, delivering the liquid in a stream of great volume into said washing chambers, and there breaking it up into unspaced, unrelated, and continually changing spray streams, which spray streams are directed upon the fruit.

Where a chemical liquid is used to remove the orchard spray residue, a rinsing in clear water must be used to entirely clean the fruit, and in the drawing my device is illustrated as using two liquids, a chemical liquid and clear water. For this purpose the round bottomed portion of the tank is divided by a partition 4 into two sumps 5 and 6, each of said sumps being provided with pumping devices for removing liquid therefrom and discharging it into overhead receptacles 7 and 8. Conveniently such pumping devices may be a helical impeller 9 within a tube 10 upon the bottom of the tank and in communication with its respective sump, as shown in Fig. 2. A conduit connects the pumping device with the respective overhead receptacle, as shown at 11.

Immediately above the sumps 5 and 6 is positioned a fruit conveyor 12, which conveyor divides the sumps from their respective washing chambers 13 and 14. Any suitable type of conveyor may be used, but it is desirable that it be of the type that rolls and turns the fruit thereupon as the fruit passes along through the washing chambers, for the purpose of thus presenting all portions of the fruit surface to the washing liquid falling thereupon from above. The conveyor shown in the drawing is of the alternate stationary and oscillating bar type, well known to the art, and therefore not described or shown in detail in this application. The mountings and driving mechanisms of such a conveyor are also well known to the art, and since they are no portion of the present invention they have been omitted from the drawing. The conveyor, however, is positioned in a novel manner that constitutes one of the important features of my invention. The fruit is fed thereupon by a continuous belt conveyor 15, and at the discharge end of the device it is deposited upon a fruit grader, not shown in the drawing. In practice in fruit packing plants the feed conveyor 15 is much lower than the grader, and therefore it is desirable that the conveyor used to carry the fruit through the washer be of such a type that it may be inclined so as to carry the fruit from the level of the feed conveyor to the level of the grader without using an elevator for that purpose. This the type of conveyor illustrated accomplishes satisfactorially. Also this type of conveyor may be constructed as a continuous conveyor throughout the entire length of the device, thus avoiding the transferring of the fruit from one conveyor to another as the fruit passes from one compartment to another in the washer.

The chemically treated liquid is contained in sump 6, and is pumped therefrom into over-head receptacle 8. From this receptacle it is to be continuously delivered in very large volume into the washing chamber 14. Any convenient means for delivering such a continuously flowing large volume of liquid may be used, that shown in the drawing being a dam or weir 16 over which the liquid flows. Thus a stream of continuously flowing liquid of great volume and of a width equal to the entire width of the washing chamber is delivered into said chamber above the fruit upon the conveyor below. This stream of liquid is to be broken up into a plurality of streams that shall fill the washing chamber and fall upon the fruit below like a heavy rain or inundation. To accomplish this I provide paddle wheels adjacent the overhead receptacles upon which the stream of liquid from the weir falls. Said paddle wheels are formed of a core or drum 17 rotatably mounted in the washing chamber, and having a plurality of radial fingers 18 thereupon. These fingers in passing through the entering stream of liquid from the weir break it up into a multiciplity of streams that completely fill the washing chamber and fall upon the fruit like a heavy inundation, as shown in Fig. 2. The fruit is thus subjected to a treatment that combines the thoroughness of immersion with the impact feature of spraying. The best possible results in washing and clensing the fruit are thus obtained.

To prevent loss of liquid at the point of entrance of the fruit I provide a deflector 19 projecting beneath the paddle wheel, and also a yieldable apron 20 adapted to contact with the fruit as it passes and turn the liquid into the washing chamber and away from the entrance passageway for the fruit, as shown in Figure 2.

The rear wall 21 of the overhead receptacle 7 forms also the front wall of the washing chamber 14. It may be conveniently inclined towards said washing chamber as shown in Fig. 2 so as to direct the liquid therein away from the succeeding washing chamber 13. An apron 22, similar to apron 20 heretofore described is positioned at the point where the fruit issues from washing chamber 14, to prevent the liquid in washing chamber 13 from passing into washing chamber 14.

The overhead receptacle 7 is constructed similarly to overhead receptacle 8, with a weir and adjacent paddle wheel exactly similar to those of the receptacle 8. Also a deflector 23 beneath the paddle wheel in washing chamber 13 turns the liquid therein away from washing chamber 14.

One feature of my device is the arrangement of the wall 21, deflector 23, and partition 4. From Fig. 2 it will be seen that there is considerable space between wall 21 and deflector 23, and that partition 4 is positioned intermediate the wall and the deflector and beneath the same. By this arrangement all intermingling of the liquids in the washing chambers 13 and 14 is effectually eliminated.

The pump devices and the paddle wheels may be driven by any suitable and convenient means, that shown being a continuous belt 24 mounted upon pulleys upon the pump devices and upon the paddle wheels, together with idler pulleys to direct the belt. A motor 25 operates said belt.

It has been found desirable to vary the angle at which the flow of liquid over the weir approaches the paddle wheel according to the length of the washing chamber. This for the reason that it is desirable to completely fill the chamber with the liquid and at the same time distribute the liquid uniformly over the area of the conveyor.

If the angle of approach of the liquid to the paddle wheel was the same for both a long and a short washing chamber, one or the other would not be served with a uniform distribution of the liquid.

To obtain uniform distribution for any length of washing chamber I provide a visor or deflector 30 adjacent the weir 16, and substantially vertically adjustable in relation thereto. A convenient manner of accomplishing the adjustment of said deflector is to provide the same with cleets 31 at the ends thereof immediately adjacent the tank sides, and securing said cleets to said tank sides by means of screws.

When a short washing chamber is used said deflector 31 is placed near the top of the wier 16, as shown in Fig. 3. As there shown this directs the liquid towards the paddle wheel at such an angle as to be substantially tangential to the path of the movement of the fingers 18 as they contact with the stream of liquid. Thus the liquid is thrown forward substantially in the direction of the horizontal arrow of Fig. 3, and falls quickly downward as shown in said figure.

When a long washing chamber is used said deflector is lowered to a position such as that shown in Fig. 4. Thus the liquid is delivered to the paddle wheel at such an angle as to be met by the fingers and given a decidedly upward or vertical direction, as shown by the vertical arrow of Fig. 4, resulting in a longer substantially horizontal movement of the spray streams.

By such adjustment an even distribution of the liquid may be obtained in any length of washing chamber.

My invention may be made of any size, and constructed of any materials deemed convenient and suitable, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. In a washing apparatus, a housing, means for conveying articles therethrough, means above said conveying means for discharging a sheet of liquid theretoward, a wheel disposed to rotate about a horizontal axis and provided with a plurality of outwardly projecting spaced fingers disposed to impinge against said sheet of liquid to cause a shower of liquid upon articles being conveyed through the housing, and means for driving said wheel.

2. In a washing apparatus, a housing, means for conveying articles therethough, a weir above said conveying means, means for discharging liquid over said weir whereby it falls by gravity in the form of a sheet toward said conveying means, a wheel rotatable about a horizontal axis parallel to said weir and provided with a plurality of outwardly projecting spaced fingers disposed to impinge against said liquid sheet, and means for driving said wheel to cause a shower of liquid upon articles being conveyed through the housing.

3. In a washing apparatus, a housing, means for conveying articles therethrough, a trough horizontally disposed above said conveying means; means for supplying liquid to said trough to cause it to overflow an upper edge thereof and fall toward said conveying means in a sheet, a wheel disposed to rotate about a horizontal axis parallel to said trough edge, said wheel being provided with a plurality of outwardly projecting spaced fingers disposed to impinge against said sheet of liquid to shower the liquid upon articles being conveyed through the housing, and means for driving said wheel.

4. In a washing apparatus, a housing, means for conveying articles therethrough, means above said conveying means for discharging a sheet of liquid theretoward, a paddle wheel rotatable about a horizontal axis and having paddles disposed to impinge against the sheet of liquid, means for driving said paddle wheel to cause a shower of liquid upon articles being conveyed through the housing, and adjustable deflecting means disposed to receive the liquid from said discharging means and direct it to the paddle wheel.

5. In a washing apparatus, a housing, means for conveying articles therethrough, a weir above said conveying means, means for discharging liquid over said weir whereby it falls by gravity toward said conveying means, an adjustable deflector disposed in the path of liquid falling from the weir, a paddle wheel rotatable about a horizontal axis and having paddles disposed to impinge against the liquid deflected by said deflector, and means for driving said paddle wheel to cause a shower of liquid upon articles being conveyed through the housing.

6. In a washing apparatus, a housing, means for conveying articles therethrough, a horizontally disposed trough arranged above said conveying means, means for supplying liquid to said trough to cause it to overflow an edge thereof, an inclined adjustable deflecting surface disposed beneath the edge of the trough to receive the liquid overflowing therefrom, a paddle wheel rotatable about an axis parallel to said trough edge and having paddles disposed to impinge against the liquid deflected by said deflecting surface, and means for driving said paddle wheel to cause a shower of liquid upon articles being conveyed through the housing.

7. In a fruit washing apparatus, a housing, means for conveying fruit therethrough, a sump below said conveying means, a horizontally disposed trough arranged above said conveying means, means for supplying liquid continuously from said sump to said trough to overflow an edge thereof, a member rotatable about an axis parallel to said trough edge and having peripheral means adapted to intercept the liquid overflowing from the trough and convert it into a shower and project it horizontally over the fruit moving on said conveyor.

8. In a fruit washing machine, a housing, means for conveying fruit therethrough, a sump below said conveying means, a horizontally disposed trough arranged above said conveying means and having a width substantially equal to said conveying means, means for supplying liquid continuously from said sump to said trough to overflow an edge thereof for its entire width, a member rotatable about an axis parallel to said trough edge and of substantially the width of said edge and having peripheral means adapted to intercept the liquid overflowing over said trough edge and convert it into a shower and project it horizontally over the fruit moving on said conveyor.

FRANK W. CUTLER.